Figure 1:
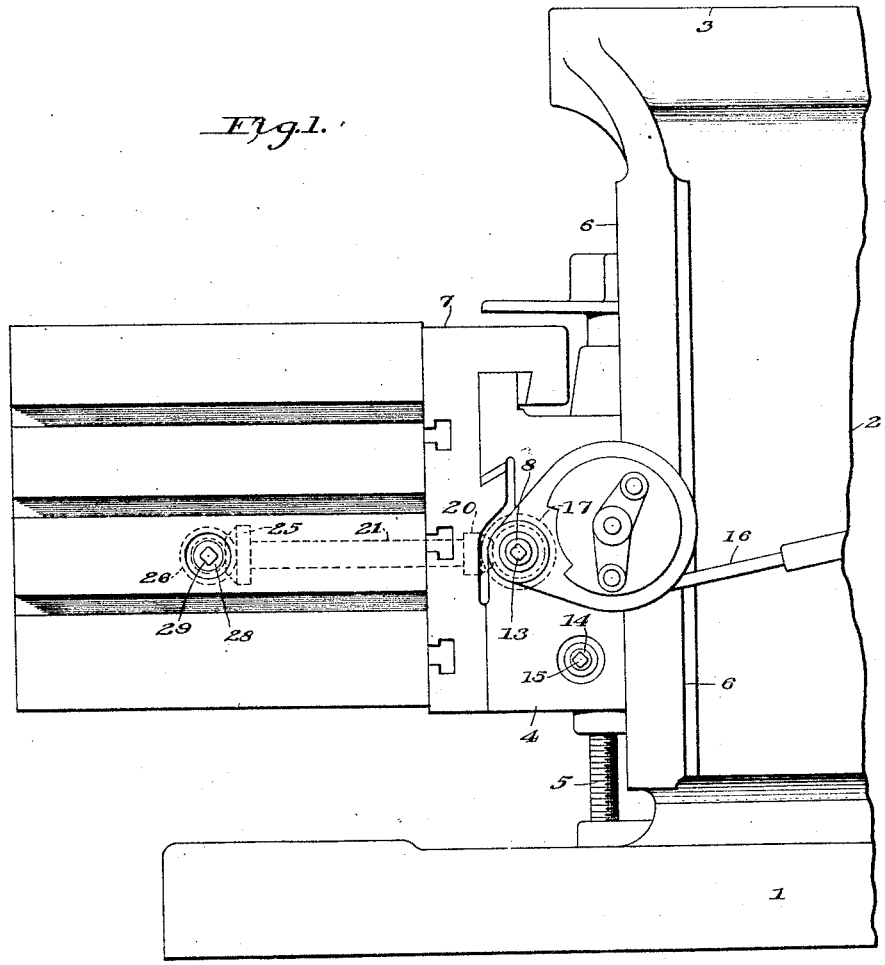

Nov. 6, 1928. 1,690,610
W. F. ZIMMERMANN ET AL
MOVABLE AND STATIONARY FEED CONTROL FOR SHAPING MACHINE WORKTABLES
Filed April 1, 1925 2 Sheets-Sheet 1

Inventors
William F. Zimmermann
Daniel Vaughn Waters
By Attorney
Albert P. Nathan Nov. 6, 1928.  1,690,610
W. F. ZIMMERMANN ET AL
MOVABLE AND STATIONARY FEED CONTROL FOR SHAPING MACHINE WORKTABLES
Filed April 1, 1925    2 Sheets-Sheet 2

Inventors
William F. Zimmermann
Daniel Vaughn Waters
By Attorney
Albert F. Nathan Patented Nov. 6, 1928.

1,690,610

UNITED STATES PATENT OFFICE.

WILLIAM F. ZIMMERMANN, OF MAPLEWOOD, AND DANIEL VAUGHN WATERS, OF HILLSIDE, NEW JERSEY, ASSIGNORS TO GOULD & EBERHARDT, OF NEWARK, NEW JERSEY, A CORPORATION OF NEW JERSEY.

MOVABLE AND STATIONARY FEED CONTROL FOR SHAPING-MACHINE WORKTABLES.

Application filed April 1, 1925. Serial No. 19,885.

Our invention is concerned with feeding mechanism for a shaping machine and is chiefly concerned with mechanism controlled from a point on the work carrying table for feeding the table along the cross head.

In a shaping machine of the type now in common use, a tool carrying ram is reciprocated across the top of the main frame of the machine. The cutting tool is supported on the ram by means of a tool head which is in the nature of a slide adapted to be manually fed towards and away from the work located below the cutting tool. The work is carried by a table which is mounted on a cross head. The cross head is vertically movable on the main frame of the machine and carries a feed screw for effecting feeding movements of the work table which is supported on the head. During the cutting operation, the work carrying table may be fed either manually or automatically and at the same time the vertical position of the cutting tool may be varied.

In cutting a horizontal surface on a piece of work, it is only necessary to effect feeding movements by the work carrying table. However, when a surface varying from a horizontal plane is being cut, it is necessary to vary the vertical position of the cutting tool at the same time the feeding movements of the table are being effected. Such a variable surface, as above referred to, is cut by manually controlling the tool head feed screw by one hand and by manually controlling the table feed screw by the other hand of the operator. In most shaping machines now in service, the table feed is manually controlled by a hand crank fitted to a squared end of the table feed screw at the front end of the cross head. A suitable hand crank is also provided for manually controlling the feed screw located on the ram for operating the tool head. Inasmuch as the operator of the machine usually sits at the side of the table and near the front thereof in order to watch the work being operated, it is inconvenient as many machines are now constructed to manually operate both feeding movements at the same time. If the left hand of the operator is used to control the feeding of the tool, his vision of the work is somewhat interrupted and it is difficult to operate the crank at the end of the cross head by means of the left hand.

One of the chief objects of our invention is to provide a shaping machine with mechanism controlled from near the machine operator to control the feeding movements of the work carrying table. Preferably, a control mechanism, which is carried by the work carrying table, is operable from the side of the table near to the operator's position. The positioning of the control for the table feed near to the operator renders it easily to control the feeding movement by means of the left hand.

In carrying out our invention, the screw shaft, which is mounted on the cross head and which controls the movement of the table on the cross head, is directly operated by the control mechanism mounted on the movable work carrying table. Preferably a gear wheel, which is secured to the table in order to move therewith, is splined to the screw shaft on the cross head. Such gear wheel is connected by gearing to an operating shaft which is operable from the side of the table. Thus, the feed screw for operating the table may be rotated either by a hand lever positioned at the end of the cross head or may be operated by means of a hand lever operated from the side of the work carrying table. Inasmuch as the operator is positioned at the side of the work carrying table, it is convenient to operate the tool feed by means of the right hand and to operate the table feed mechanism mounted on the table by means of the left hand.

It has been proposed heretofore to rotate the nut on the work carrying table by means of mechanism mounted on the table whenever it is desirable to effect a feeding movement of the work from the position adjacent to the operator. In such a construction it is apparent that when the feeding is manually controlled by the mechanism mounted on the table, it is necessary to lock the feed screw against rotation. Moreover, when the feeding is effected by rotating the feed screw shaft either manually or automatically to effect feeding movement of the table, it is necessary to lock the nut on the table against rotative movement. This adds an additional function or burden to the operator of the machine. It is necessary for him to set either the nut or the feed screw in a locked position before a feeding operation can be performed. In a machine constructed in accordance with our invention the nut on the table is maintained in fixed position no matter whether the feeding is controlled from the end of the cross head or from the side of the table. The feed screw is rotated in both cases to effect movement of the table.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 2:
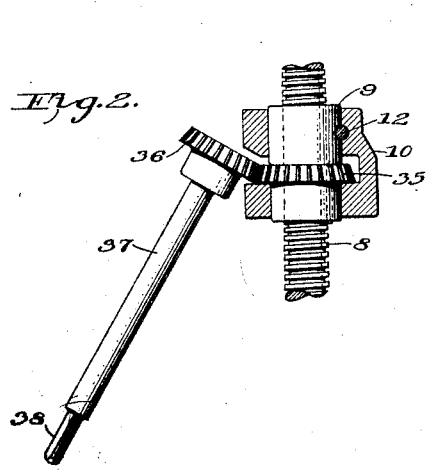
Figure 3:
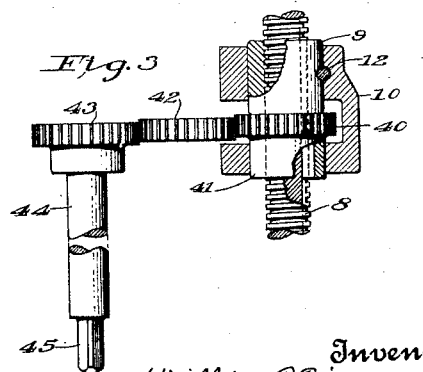
Figure 6:
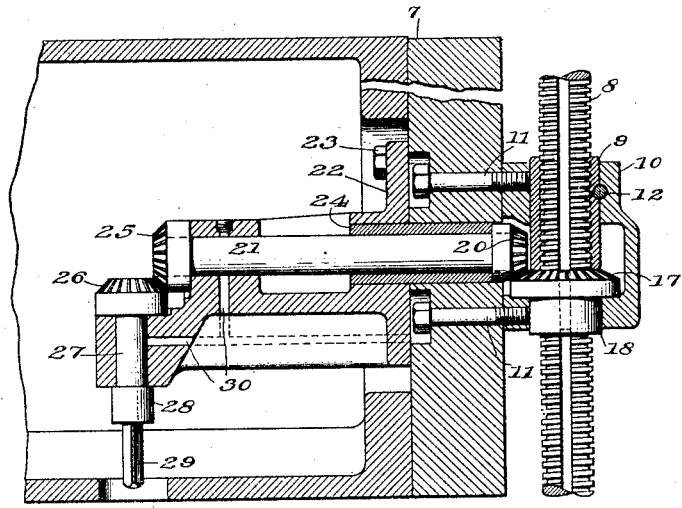
Figure 4:
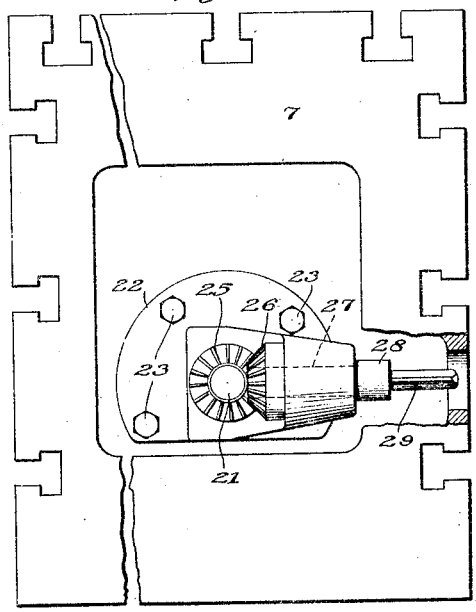
Figure 5:
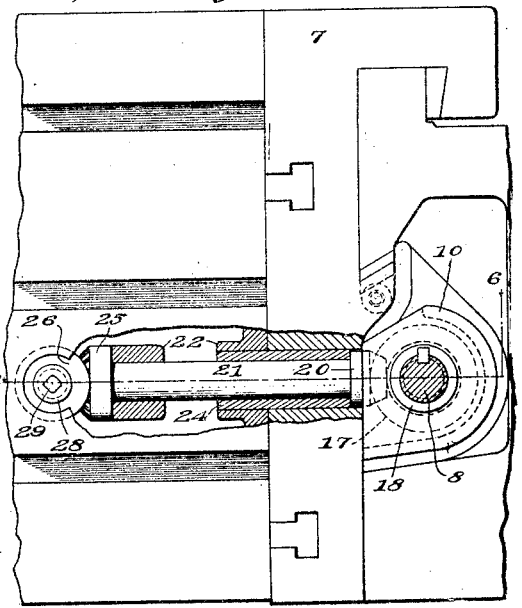

Figure 1 is a partial elevational view of a shaping machine constructed in accordance with our invention. Figs. 2 and 3 are views of modified means for controlling a feed mechanism constructed in accordance with our invention. Fig. 4 is an end view of the table shown in Fig. 1. Fig. 5 is a side view of the table with parts thereof broken away. Fig. 6 is a sectional view along the line 6—6 of Fig. 5.

Referring to the drawings, a shaping machine is illustrated comprising a base 1 upon which is mounted a main frame 2. The main frame 2 is provided with ways 3 upon the top thereof for a ram (not shown). The construction and operation of the ram (not illustrated) is old and well known in the art and a description and illustration thereof is deemed unnecessary inasmuch as our invention is chiefly concerned with the means for feeding the work carrying table.

A cross head 4 is operable by means of a feed screw 5 along ways 6 formed on the main frame 2. Such cross head serves as a support for a work carrying table 7 which may be of any conventional construction and is movable along the cross head. A table feed screw 8, which is rotatably mounted on the cross head 4, is connected to the table 7 by means of a nut 9. The nut 9 is mounted in a block 10 which is secured to the table 7 by means of bolts 11. A suitable pin 12 is provided for not only preventing rotation of the nut 9 in the block 10 but also for preventing axial movement of the nut 9 in the block 10. The table feed screw 8 is provided with a squared end 13 which may be operated by a suitable hand lever (not shown) for effecting movement of the table along the cross-head. A cross-head raising shaft 14 is provided with a squared end 15 which may be operated by a hand lever for controlling the vertical position of the cross-head and the work carrying table. The shaft 14 is connected to the screw shaft 5 in any conventional manner. The table feed screw 8 may not only be operated manually but also may be controlled automatically by means of a connecting rod 16 in accordance with the usual practice.

A bevel gear wheel 17 is splined to the feed screw 8 and is operated from the side of the work carrying table 7 for rotating the feed screw 8 to effect feeding movement by the table. The bevel gear wheel 17 is provided with a hub portion 18 which is rotatably mounted in the block 10. The gear wheel is held in position on the block 10 between the nut 9 and a side wall of the block in order to compel movement thereby in accordance with the feeding movement of the table 7. A bevel gear wheel 20, which is fixedly mounted on a shaft 21, meshes with the bevel gear wheel 17. The shaft 21 is supported in a bracket 22 which is secured to the table 7 by means of bolts 23. Preferably, a suitable bushing 24 is provided adjacent one end of the shaft 21 for supporting it not only in the bracket 22 but also in a portion of a table 7. A second bevel gear wheel 25, which is fixedly mounted on the shaft 21, meshes with a bevel gear wheel 26 on an operating shaft 27. The operating shaft is provided with a bearing in the bracket 22 and is provided with a shoulder portion 28 which cooperates with the bevel gear wheel 26 to prevent any axial movement of the shaft. A squared end portion 29 on the operating shaft is provided to be engaged by a suitable hand lever for controlling the feeding movements of the table. Suitable oil ducts 30 are formed in the bracket 22 in order to supply lubricating material to the bearings for the shaft 21 and the operating shaft 27.

In the above described construction it will be noted the feed screw shaft 8 may be rotated either by the squared end 13 or by means of a squared end 29 on the operating shaft 27. The operating shaft 27 is located adjacent to the position occupied by the machine operator during a shaping operation. Moreover, it is apparent that the machine operator may control the hand lever secured to the shaft 29 with his left hand and control the hand lever (not shown) for feeding the tool with his right hand without any inconvenience.

In Figs. 2 and 3 of the drawings are illustrated modifications of our invention. Referring to Fig. 2 a bevel gear wheel 35, which is splined to the feed screw shaft 8, meshes with a bevel gear wheel 36 which is mounted on an operating shaft 37. The bevel gear wheel 35 is rotatably mounted in the block 10 in the same manner as the bevel gear wheel 17 shown in Fig. 6 of the drawings. The operating shaft 37 projects from the side of the work carrying table and is provided with a squared end 38 which may be operated by a suitable hand lever (not shown). The operating shaft 37 is not perpendicularly disposed to the side of the work carrying table as in the case of the operating lever shown in Fig. 6 of the drawings.

Referring to Fig. 3 of the drawings, a spur gear 40 is splined to the shaft 8 in the same manner as the bevel gear wheel 17 shown in Fig. 6 of the drawings. The spur gear wheel 40 is provided with a hub portion 41 which is provided with a bearing in the block 10 in the same manner as the hub portion 18 on the bevel gear wheel 17. The spur gear wheel 40 meshes with an idler gear wheel 42 which in turn meshes with a gear wheel 43 on an operating shaft 44. The operating shaft 44 projects from the side of the table 7 and is provided with a squared end 45 adapted to be operated by means of a suitable hand lever. Any desired gearing may be provided for connecting the operating shaft 44 to the feed screw shaft 8 and the size and number of the gears may be varied as desired. Although the operating shaft has always been shown as operable from the side of the table adjacent the operator, it is to be understood that the operating shaft can be positioned otherwise on the table.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention, and, therefore, such adaptations should be, and are intended to be, comprehended within the meaning and range of equivalency of the following claims:—

Having thus revealed this invention, we claim as new and desire to secure the following combinations and elements, or equivalents thereof, by Letters Patent of the United States:—

1. In a shaping machine, the combination comprising a cross head; a work carrying table mounted on said cross head; a bracket removably secured to said table and providing spaced walls; a nut fixedly mounted in one wall of said bracket; a screw shaft rotatably mounted on the cross head and engaging said nut to effect movement of the table along the cross head; a gear wheel having a spline connection with said screw shaft and having a bearing in the other wall of said bracket to be moved in accordance with its movement; an operating shaft projecting from the table and adapted to receive an operating crank; and mechanism for connecting the operating shaft to said gear wheel to control the table movement by said operating shaft.

2. A shaping machine combining a frame; a cross-head vertically adjustable on said frame and providing vertically spaced guideways; a work-table translatably mounted on said guideways and having a portion projecting into said cross-head intermediate said spaced guideways; a feed-screw rotatably journaled lengthwise of said cross-head; a non-rotatable nut supported by the projecting portion of said table and having a threaded engagement with said feed-screw; manual means connected to one end of said feed-screw to rotate said feed-screw thereby to effect translation of said table; a shaft journaled in said work-table transverse to said feed-screw; a driving connection between said shaft and said screw; and manual means carried by said table to rotate said shaft and thereby said feed-screw to effect translation of said table.

In witness whereof, we have hereunto subscribed our names.

WILLIAM F. ZIMMERMANN.
DANIEL VAUGHN WATERS.